United States Patent [19]

Nishiyama et al.

[11] 4,226,308
[45] Oct. 7, 1980

[54] DISC BRAKE COVER

[75] Inventors: Yukinori Nishiyama; Masachika Yamamoto, both of Itami, Japan

[73] Assignee: Sumitomo Electric Industries, Ltd., Osaka, Japan

[21] Appl. No.: 34,701

[22] Filed: Apr. 30, 1979

[30] Foreign Application Priority Data

Apr. 28, 1978 [JP] Japan .............................. 53-57066[U]

[51] Int. Cl.³ ............................................ F16D 65/00
[52] U.S. Cl. .............................. 188/218 A; 280/152.3;
280/157; 301/6 WB
[58] Field of Search ................ 188/18 A, 218 A, 71.1;
192/112; 301/6 WB; 280/152.3, 154.5 R, 154.5
A, 157; 403/327; 362/18

[56] References Cited

U.S. PATENT DOCUMENTS

| 768,723 | 8/1904 | Behre et al. | 280/157 |
|---|---|---|---|
| 2,060,403 | 11/1936 | Sweet | 403/327 X |
| 3,366,406 | 1/1968 | Morris | 403/327 X |
| 3,931,871 | 1/1976 | Martin | 188/18 A X |
| 4,005,768 | 2/1977 | Bubnash et al. | 188/218 A |

FOREIGN PATENT DOCUMENTS

| 2706377 | 3/1978 | Fed. Rep. of Germany | 188/218 A |
| 18728 | of 1898 | United Kingdom | 280/157 |

Primary Examiner—George E. A. Halvosa
Attorney, Agent, or Firm—Sughrue, Rothwell, Mion, Zinn and Macpeak

[57] ABSTRACT

A disc cover for disc brakes on a two-wheeled vehicle having a series of fan elements attached to a wheel attaching axis and adapted to be nested in a stored configuration or overlapping and covering the disc when deployed. The elements are attached to each other when deployed and are all locked together when nested by an attaching pin. Each element is in the shape of a U or L such that the outer surface projects over the disc surface but the inwardly turned portion extends only part way about the disc.

7 Claims, 8 Drawing Figures

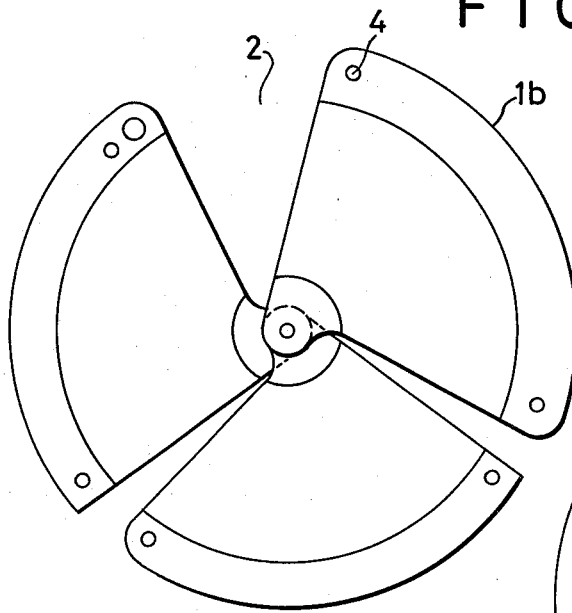
FIG. 3
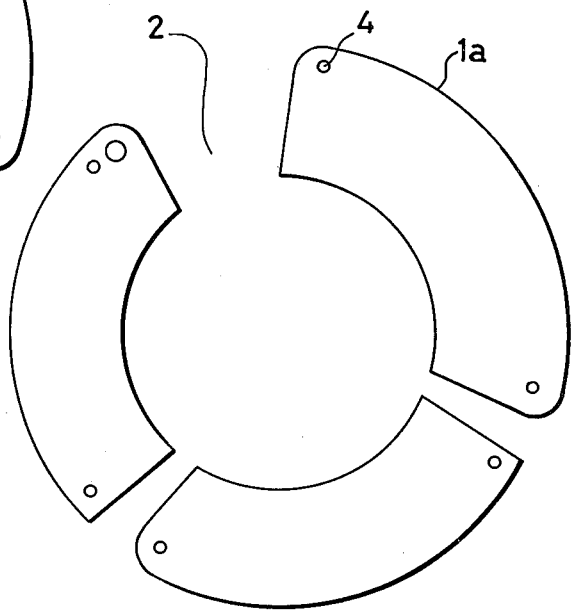
FIG. 4
FIG. 5a
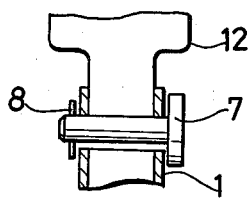
FIG. 5b
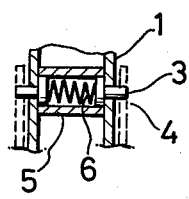
FIG. 7
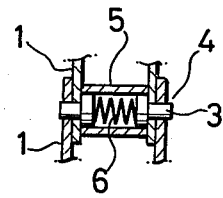
FIG. 6
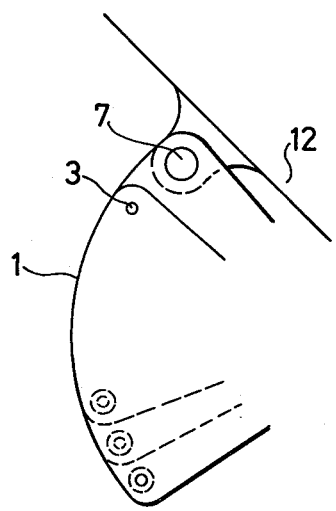

DISC BRAKE COVER

BACKGROUND OF THE INVENTION

This invention relates to a disc cover for disc brakes on a two-wheeled vehicle.

In such disc brakes, in ordinary use with no environmental considerations there may be no problems that would inhibit braking capability. However on a rainy day the disc surface may be covered with rain drops, mud, etc., and this would result in unstable braking. This is a serious problem since two-wheeled vehicles have no inherent stability and a deterioration of braking can lead to accidents and driver injury.

SUMMARY OF THE INVENTION

Accordingly, it is an object of this invention to eliminate the disadvantages and provide a disc cover in which the disc can be exposed thereby to enhance radiation of heat, and also, but, where conditions dictate, the disc can be covered to thereby keep free from rain or mud.

This invention will now be described with reference to the drawings.

BRIEF DESCRIPTION OF THE DRAWINGS

FIG. 3 is a side view of a disc cover as viewed from the outside of the disc with the cover elements separated;

FIG. 4 is a side view of a disc cover as viewed from the inside of the disc with the cover elements separated;

FIGS. 5(a) and 5(b) are sectional views taken along A—A and B—B in FIG. 1, respectively;

FIG. 6 is a side view showing the state wherein a plurality of cover units are folded, as viewed from the outside of the disc; and FIG. 7 is a sectional view taken along C—C in FIG. 1.

DESCRIPTION OF THE PREFERRED EMBODIMENT

Figure 1:
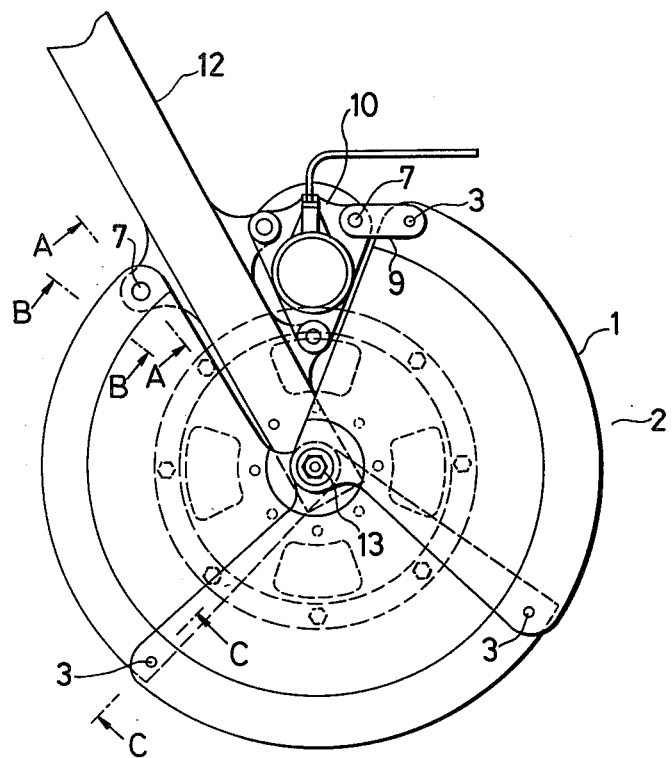
FIG. 1 is a side view of a wheel portion of a two wheeled vehicle to which the disc cover according to this invention is attached, showing the state wherein a plurality of cover units are spreaded out.

Referring now to the drawings, reference numeral 1 designates a cover unit, with a disc cover 2 comprising a plurality of the cover units. A fixing pin 3 and a pin hole 4 for receiving the fixing pin 3 are shown on each cover. A collar 5 (Fig. 7) houses a spring 6. Attaching pins 7 are held by a split pin 8 (Fig. 5(a)). A supporting plate 9 is coupled to a disc brake 10 attached in turn to a fork 12. Element 11 is a disc of the disc brake 10 (Fig. 2) and element 12 is a wheel attaching fork. Finally as shown in FIG. 2 a wheel attaching axis 13 is positioned at one end of the attaching fork.

Figure 2:
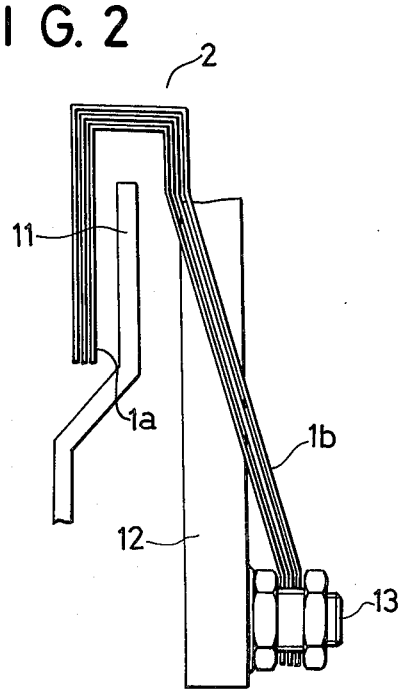
FIG. 2 is a cross-sectional front view of a disc cover according to this invention, attached to a two wheeled vehicle, showing the state wherein a plurality of cover units are folded.

The cover unit 1 has a U-shaped or L-shaped cross section in the radial direction of which the two vertical portions are of different lengths, as shown in FIG. 2. The side of the cover unit on the outside of the disc is of a fan shape as shown in FIG. 3 and the side on the inside of the disc, i.e. the wheel side is of a shape such that the pivot portion is eliminated from the fan shape. This is shown in FIG. 4.

As shown in FIG. 2, the disc 11 is positioned in a hollow portion of the U-shaped cross section of the cover unit 1. When a plurality of components of the cover 1, i.e. the disc cover 2 are spread out, the side of the disc cover is of a circular shape except for the disc brake assembly as shown in FIG. 1. Hence, the disc 11 can be covered inside of the disc cover. Also, one cover unit can be fixed in place to another cover unit as shown in FIG. 7. Furthermore, when a plurality of the cover units 1 are folded, one cover unit fits into another subsequent cover unit, as shown in FIG. 2. As a result, all of the cover units 1 can be gathered as one unit. Each of the cover units can be fixed in place as described by the dotted line in FIG. 5(b) or in FIG. 6.

As shown in FIGS. 3 and 4 the cover unit 2 has a plurality of elements adapted to fold fan like when stored. The elements 1a are shown in FIG. 4 corresponding to the component parts when viewed from the inside of the disc. FIG. 3 shows the components 1b as viewed from the right in FIG. 2. FIGS. 3 and 4 are solely for purposes of illustration, it being understood that the cover elements are not spread in actual use as shown in those figures.

The two states are shown more specifically in FIGS. 1, 2 and 6. FIG. 1 shows the deployed states, while FIGS. 2 and 6 show the retracted or stored state. In the stored state, the fixing pins 3 are removed together with the supporting plate 9 and the cover units are nested. The attaching pin 7 (FIG. 5a and FIG. 6) is used to couple one cover to a flange section of the wheel attaching fork. As shown in FIG. 5a, pin 7 is a clevis pin having a split pin or other suitable locking device (cotter pin, cotter ring or the like) to hold it in place. Hence, the attaching pin 7 projecting through the fork 12 and sides of the cover unit couples those elements together.

The axis 13 has, as shown in FIG. 1, suitable locking members such as units, lock washers and the like. By applying suitable compressive force to cover units mounted on the attaching axis, a frictional holding force may be generated to retain the elements in the closed position. Also, as shown in FIG 5(b) a fixing pin may be placed to lock the cover units together. The fixing pin has extending rod elements outwardly biased by spring 6. The rod elements are of a sufficient length to project through the holes 4 in each cover unit. Hence, the fixing pin 3 locks the elements together in a stored position as shown in FIG. 6. It is noted that the holes 4 are positioned to coincide with each other for insertion of the pin 3 but at the other end of the cover unit are staggered due to the size difference. When the cover units are to be deployed, the fixing pin is removed and the elements are spread. As shown in FIGS. 1 and 7, the cover units overlap such that holes 4 for two adjoining units coincide. Fixing pins 3 are then inserted and held in position by internal spring elements 6. The supporting plate is coupled at one end by a fixing pin 3 to a cover unit and the at the opposite end to the brake assembly 10 by the attaching pin 7. In the deployed condition, the disc 11 is shielded from spray etc. The cover units are locked into place by the pins forming a rigid circle of attachment to the fork 12.

Thus, according to this invention, in ordinary usage the disc can be exposed to thereby effectuate a sufficient radiation of heat, and on a rainy day the disc surface except for the brake portion can be covered to thereby keep it free from rain or dust.

It is apparent that modifications can be made without departing from the essential aspects of this invention. For example, the shape of the cover units may be changed and the technique of attachment altered. The essential aspect however is the foldability and ease of deployment.

What is claimed is:

1. A disc cover for a brake on a two-wheeled vehicle comprising:
    a vehicle structural support, a disc brake assembly coupled to said support, a braking disc and a central axis about which said disc is mounted,
    a cover unit having a plurality of overlapping sections, each section coupled to said central axis, said sections adapted to nest in a closed configuration and to be spread to substantially cover one side of said breaking disc,
    means to hold said sections in closed or spread configurations, and a plurality of holes in each section, one hole in each section positioned to be in alignment with a hole in each other section when said sections are nested, wherein said holding means comprises a fixing pin positioned inside said cover unit and having extending rods projecting through said aligned holes when said sections are nested.

2. The apparatus of claim 1 wherein each of said sections is in a substantially U-shape about said braking disc.

3. The apparatus of claim 1 wherein each of said sections is in a substantially L-shape about said braking disc.

4. The apparatus of claims 1, 2 or 3 wherein each of said sections is a different size.

5. The apparatus of claim 1 wherein holes of two adjoining sections are positioned to be in alignment when said sections are spread and said fixing pin can also extend through these aligned holes.

6. The apparatus of claim 1 further comprising means to attach one of said sections to said structural support.

7. The apparatus of claim 6 further comprising means to couple one section to said disc brake assembly when said cover is spread.

* * * * *